United States Patent Office 2,852,571
Patented Sept. 16, 1958

---

2,852,571
PRODUCTION OF POLYCHLOROBENZENES

Jean Leon Maurice Frejacques, Paris, and Henri Martin Guinot, Versailles, France, assignors to Pechiney, Compagnie de Produits Chimiques et Electrometallurgiques, Paris, France, a corporation of France No Drawing. Application May 5, 1952
Serial No. 286,206
Claims priority, application France May 8, 1951
7 Claims. (Cl. 260—650)

This invention relates to processes for producing compounds which may be referred to as benzene polychlorinated derivatives or polychlorobenzenes, containing more than three chlorine atoms in the molecules from hexachlorocyclohexane and from trichlorobenzene producible therefrom.

When hexachlorocyclohexane, known commercially as benzene hexachloride, is produced by adding six atoms of chlorine to the benzene molecule, several different isomers are produced but only the gamma isomer has been found to possess strong insecticidal activity. Although the crude mixture of isomers is extensively employed for insecticidal purposes, producers are now to an ever increasing extent separating the gamma isomer because of certain objectionable properties of one or more of the other isomers, as a strong and persistently moldy smell. In view of this development, this by-product benzene hexachloride mixture of other isomers composed principally of the alpha isomer is of substantially little value and is available at low cost. Some of it, however, has been converted into trichlorobenzene, the market for which is limited.

A general object of the invention is to prevent loss of substantial quantities of benzene and chlorine involved in the production of the gamma isomer of benzene hexachloride produced by the reaction of benzene with chlorine and to find utility for the by-products.

Another object of the present invention is to produce valuable polychlorinated benzene products from these by-product relatively inactive benzenehexachloride isomers mentioned above. Another object is to provide a process for converting benzenehexachloride to hexachlorobenzene in high yields without introducing any chlorine into the reaction mass. Another object is to provide a process for converting benzene hexachloride into tetrachlorobenzene in substantial yields.

Broadly stated, the invention may be defined as involving processes for producing polychlorobenzenes containing more than 3 chlorine atoms in the molecule from benzene hexachloride compounds by reacting the same with oxygen in the presence of a Deacon Process type catalyst. The reaction occurs at highly elevated temperatures at which the benzene hexachloride decomposes in part and loses hydrogen atoms. Certain observations indicate that the reaction which produces hexachlorobenzene may occur in several steps, as follows:

Benzene hexachloride begins to decompose when heated to a temperature of about 270° C., release hydrochloric acid and forms trichlorobenzene. As the temperature increases the decomposition accelerates. This reaction is as follows:

(1) $C_6H_6Cl_6 \rightarrow C_6H_3Cl_3 + 3HCl$

In the presence of the Deacon catalyst, the hydrogen chloride appears to be oxidized by means of the oxygen of the air, yielding chlorine and water in accordance with the following equation:

(2) $3HCl + \frac{3}{4}O_2 \rightleftharpoons \frac{3}{2}Cl_2 + \frac{3}{2}H_2O$ The chlorine thus released apparently reacts with the trichlorobenzene forming hexachlorobenzene and hydrochloric acid in accordance with the following reaction:

(3) $C_6H_3Cl_3 + 3Cl_2 \rightarrow C_6Cl_6 + 3HCl$

This final quantity of hydrochloric acid may be retransformed into chlorine by reaction with excess oxygen present.

The over-all reaction may be represented by the schematic equation as follows:

(4) $C_6H_6Cl_6 + \frac{3}{2}O_2 \rightarrow C_6Cl_6 + 3H_2O$

The processes of the invention are generally applicable to the treatment as raw material of any of the benzene hexachloride isomers and to any combination of the same and also to the ordinary technical mixture, hereinbefore referred to as commercial benzene hexachloride, which may contain various impurities including chlorinated benzene products containing more chlorine than benzene hexachloride.

The process of the invention may be carried out as if a single reaction were taking place, but it can be divided into two separate distinct steps, the first involving the thermal decomposition or cracking of the benzene hexachloride to form a mixture of trichlorobenzene and hydrochloric acid and the second involving the reaction of the trichlorobenzene with hydrochloric acid and oxygen in the presence of the catalyst. The invention contemplates the use of trichlorobenzene as an alternative raw material. Accordingly, a specific embodiment of the invention involves heating trichlorobenzene, hydrogen chloride and air in the presence of a Deacon catalyst, for the desired polychlorobenzenes can thereby be obtained.

A specific embodiment of the invention relates to a process whereby tetrachlorobenzene is produced in preponderating amounts. In this process, by-product benzene hexachloride is first thermally cracked thereby providing trichlorobenzene in admixture with hydrogen chloride. The hydrogen chloride is then wholly or partially separated from the trichlorobenzene and thereupon a mixture of trichlorobenzene vapors and hydrogen chloride in a quantity lower than that obtained by the decomposition of the benzene hexachloride is passed together with air into contact with the Deacon type catalyst.

The processes of the present invention are capable of producing hexachlorobenzene, pentachlorobenzene, tetrachlorobenzene. One of the features of the present invention is that the proportions of these reactants obtained can be altered simply by altering the conditions of the reaction or proportions of the reactants. If the quantity of oxygen, of hydrogen chloride or of both is reduced, proportion of less chlorinated derivatives and particularly of tetrachlorobenzene predominates. The proportion of tetrachlorobenzene in the reaction product, can also be increased by increasing the speed with which the reactant gases are passed over the catalyst.

The process of the invention may be carried out in a single reactor at a temperature as low as about 350° C. but for practical reasons higher temperatures are preferred. An acceptable range is 360° to 440° C. but best results are generally obtained within the range of from 380° to 425° C. When attempts are made to employ higher temperatures than those disclosed, excessive volatilization of the catalytic chlorides used may occur. Any of the Deacon process type catalysts may be employed with some degree of success. By Deacon process type catalyst we mean any catalyst which is able to accelerate the conversion of hydrogen chloride into chlorine under the action of air. The catalyst is laid upon a carrier, which may be inert (such as refractory brick) or have a dehydrating effect (such as alumina).

Very good results are obtained with a cupric chloride alumina catalyst. Instead of cupric chloride, cuprous and cupric oxide which are rapidly transformed in cupric chloride in the reaction conditions may be used as catalysts.

Although air may be satisfactorily used in the reaction, pure oxygen may be substituted therefor with the advantage that the rate of production of hexachlorobenzene or other desired products is increased although the same rate of feed of benzene hexachloride over the catalyst is maintained.

The process of the present invention has in addition to the advantages already made apparent, the outstanding feature that it enables one to obtain economically a series of valuable chemicals from a by-product which is commercially of little or no value and ordinarily has to be disposed of at a cost to the producer. The process also has the advantage that the conditions of the reaction may be easily altered to produce preponderating quantities of hexachlorobenzene or of tetrachlorobenzene.

The polychlorobenzene produced by the present invention may be employed for various purposes in industry, but their primary utility lies in the field of organic synthesis. The hexachlorobenzene for example, can be easily transformed by means of any of several well known processes into pentachlorophenol.

Example 1

By-product benzene hexachloride from which the gamma isomer has been substantially wholly removed is directed by a screw conveyor into a vessel provided with a heating means. In this vessel the product is melted and then vaporized by a blast of air introduced into the bottom of the vessel. The vaporization hence is assisted by the air.

The mixed vapors are then conducted into a reactor containing a catalyst of cupric chloride supported upon activated alumina. The reaction zone is heated to a temperature of 425° to initiate the reaction and thereafter the heat developed during the process maintains the required temperature.

The vapors leaving the reactor are then conducted into a large externally cooled vessel where the hexachlorobenzene solidifies in the form of crystals. The benzenehexachloride is wholly converted into polychlorobenzene derivatives at the said temperature when the rate of feed of the benzene hexachloride amounts to about 100 grams per liter of catalyst per hour. The product is composed predominantly of hexachlorobenzene.

Example 2

Commercial benzene hexachloride is thermally cracked in accordance with known procedures to provide trichlorobenzene. Seventy grams of this trichlorobenzene together with 27 liters of hydrogen chloride and 73 liters of air are introduced per hour into a reactor containing one liter of a Deacon catalyst composed of cupric chloride supported on alumina. When the vapors leaving the reactor are condensed, it will be found that 105 grams of a mixture are obtained per hour containing substantially 81% of hexachlorobenzene, 1.8% of pentachlorobenzene, 11.4% of tetrachlorobenzene, 3.8% of tetrachloroethylene and finally 1.9% of carbon dioxide. These products may be condensed in the manner hereinbefore described and separated as desired.

Example 3

One hundred and sixty grams of trichlorobenzene are fed per hour into a reactor heated to 390° C. containing one liter of an alumina-cupric oxide Deacon type catalyst in admixture with a small quantity of kaolin in order to lessen crumbling tendencies. At the same time 17 liters of hydrogen chloride and 50 liters of air are introduced per hour into the reactor. In the effluent gases, a mixture is obtained composed of 22.6% of hexachlorobenzene, 8.1% of pentachlorobenzene, 33% of tetrachlorobenzene, 1.3% of tetrachloroethylene and 35% of unchanged trichlorobenzene. These products may be condensed in the manner hereinbefore described and separated as desired.

It will be observed that in this procedure of Example 3, the rate of trichlorobenzene passage over the catalyst is increased and the amount of hydrogen chloride used is reduced. As a result a larger quantity of tetrachlorobenzene is obtained. In any operation of the process the rate of feed or the amount of hydrogen chloride employed may be altered to cause the reaction mass to vary with reference to the respective polychlorobenzene products obtained.

It should be understood that the present invention is not limited to the specific procedure and examples herein given, but that it extends to all equivalent procedures and reactions which will occur to those skilled in the art.

We claim:

1. A process for producing polychlorobenzenes containing more than three chlorine atoms in the molecules which comprises, heating a mixture of benzene hexachloride vapors with air in the presence of a Deacon Process type catalyst at an elevated temperature at which the benzene hexachloride decomposes and the desired polychlorobenzenes are formed.

2. A process for producing polychlorobenzenes containing more than three chlorine atoms in the molecules which comprises, heating a mixture of benzene hexachloride vapors with air in the presence of a copper chloride catalyst, supported upon alumina at an elevated temperature at which the benzene hexachloride decomposes and the desired polychlorobenzenes are formed.

3. A process for producing polychlorobenzenes containing more than three chlorine atoms in the molecules which comprises, heating a mixture of benzene hexachloride vapors with air in the presence of a copper chloride catalyst, supported upon alumina at an elevated temperature within the range of about 360°–440° C.

4. A process for producing polychlorobenzenes containing more than three chlorine atoms in the molecules which comprises, passing vapors of benzene hexachloride in admixture with air at a temperature between about 360° and 440° C. into contact with a catalyst of the Deacon Process type, whereby the benzene hexachloride is decomposed and desired polychlorobenzenes are formed.

5. A process for producing polychlorobenzenes containing more than three chlorine atoms in the molecules which comprises, vaporizing a by-product benzene hexachloride composition obtained by removal of the gamma isomer from commercial benzene hexachloride products, heating the said vapors with air in the presence of a Deacon Process type catalyst at a temperature of from about 360°–440° C., and condensing and collecting the polychlorobenzenes formed.

6. A process for producing polychlorobenzenes containing more than three chlorine atoms in the molecules which comprises, heating a mixture of benzene hexachloride vapors with air in the presence of a Deacon Process type catalyst at a temperature of from about 380° to 425° C. and separating the polychlorobenzene formed from the catalyst and cooling and collecting the same.

7. A process for the production of hexachlorobenzene comprising treating benzene hexachloride with excess air at elevated temperature in a reaction zone containing a Deacon Process catalyst, removing the product from the reaction zone and condensing the chlorinated benzene formed.

References Cited in the file of this patent

UNITED STATES PATENTS

| 1,934,675 | Mills | Nov. 7, 1933 |
| 1,963,761 | Prahl | June 19, 1934 |
| 2,152,890 | Kipper | Apr. 4, 1939 |
| 2,221,301 | Kipper | Nov. 12, 1940 |

OTHER REFERENCES

Tei et al.: "Mem. Coll. Sci. Kyoto Imp. Univ.," vol. 10-A, page 326 (1927).